Feb. 19, 1946.   A. RINGER   2,395,194
CAMERA
Filed Dec. 17, 1943

Inventor
Arthur Ringer
By George A. Thorpe
Attorney

Patented Feb. 19, 1946

2,395,194

UNITED STATES PATENT OFFICE 2,395,194

CAMERA

Arthur Ringer, Paola, Kans.

Application December 17, 1943, Serial No. 514,699

11 Claims. (Cl. 95—55)

This invention relates to cameras and more especially to stereoscopic cameras, though certain features hereinafter referred to are applicable to single-lens cameras.

The primary object of the invention is to produce a shutter mechanism whereby so-called instantaneous exposures of variable length may be accurately obtained.

Another object of the invention is the provision of a shutter for stereoscopic cameras whereby the exposure through both lenses shall begin at the same instant and terminate at the same time.

A still further object, a shutter-locking mechanism susceptible of ready application at small expense, to practically all cameras utilizing the two-blade type of shutter, in which one blade moves a greater distance in both directions than the other.

Another object is the provision of a camera whereby the exposure is made, not by applying manual force, as conventional, which often causes a movement of the camera during the exposure and results in a blurred picture, but by utilizing a spring to actuate the shutter in making an exposure, and thereby eliminate the chance of camera movement at the critical time of "exposure."

A still further object is to provide a camera possessing the advantageous features above set forth as objectives, and which is of simple, strong and durable construction and dependable in operation, and of novel design and attractive appearance.

With the objects mentioned and others in view, the invention consists in certain new and useful features of construction and combinations of parts, as hereinafter described and claimed; and in order that it may be fully understood, reference is to be had to the accompanying drawing, in which:

Figure 1:
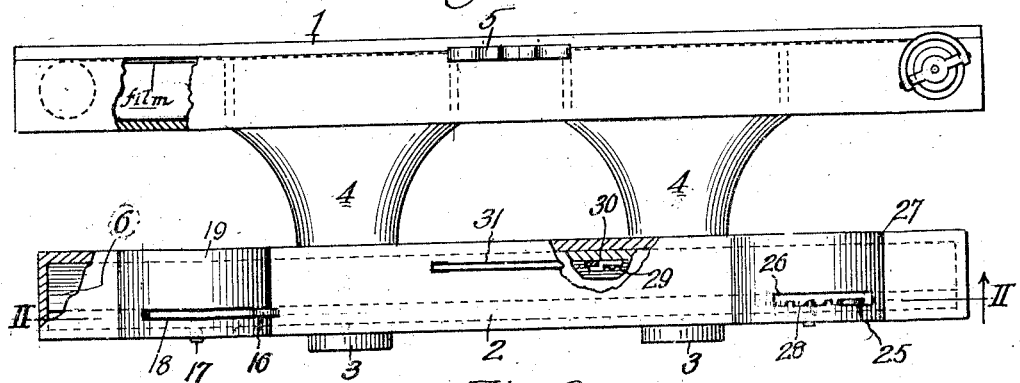
Figure 1 is a top plan view of a stereoscopic camera embodying the invention.

Referring now to the detail construction of the camera, as depicted by the drawing, it will be noted there is a rear compartment 1, wherein is located the usual film and supporting and adjustment accessories, not detailed, as of conventional type and service. Spaced forwardly from compartment 1, is a shutter mechanism compartment 2, equipped in its front wall with spaced lenses 3, and connected by funnel-shaped light-passage elements 4, to the compartment 1, the elements 4 being axially alined with the lenses. As a convenient means for finding the view or object to be pictured, an upstanding sight-guide 5, rises from the top of compartment 1.

Within the compartment 2, it is desirable to suitably secure a housing 6, divided into parallel front and rear chambers by a partition 7, and in the latter and in the front and rear walls of the housing are sight-openings 8, alined with the respective spaced lenses if the camera is of the stereoscopic type, as shown. In a single lens camera, there will be only a single set of alined sight-openings in the housing in registration with the lens.

Fitting slidingly within the front chamber of the housing is the primary blade 9, of the shutter, provided in a camera of the stereoscopic type, with two sight-openings 10, spaced apart to correspond with the spacing of the lenses and housing openings. Within the rear chamber of the housing is the secondary blade of the camera shutter, provided like blade 9, with correspondingly-spaced sight-openings 12. The secondary blade exceeds in length the primary blade, and is provided at the right-hand end with a forwardly projecting lug 13, and at its opposite end with a similar lug 14, both lugs extending through similar longitudinal slots 15, in the partition 7 of the housing and into the path of movement of the primary blade, the latter abutting lug 13 during its movement to the right, and the lug 14 during the reverse movement. The arrangement is such, that after the primary blade has been moved a certain distance to the right, it shall abut the lug 13 and move the secondary blade in the same direction until the movement terminates, it being noted in this connection that the related openings of the two blades is such that the openings 10 of the primary blade passes the openings 6 of the housing before the openings 12 of the secondary blade register with the housing openings, and that as the openings 12 are brought into registration with the openings 8, the right-hand travel of the shutter is concluded and the primary blade is blanking said openings 8. The shutter movement to the right described, is effected under the application of force applied manually, as hereinafter explained.

Figure 3:
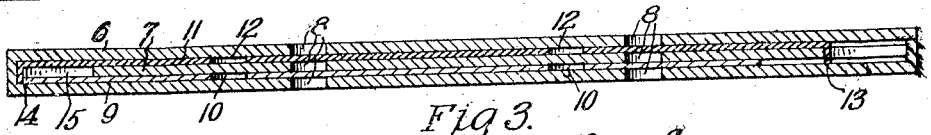
Figure 3 is a horizontal section taken on the line III—III of Figure 2, but showing only the housing and the shutter blades, with the latter in their normal or "rest" position.
Figure 4:
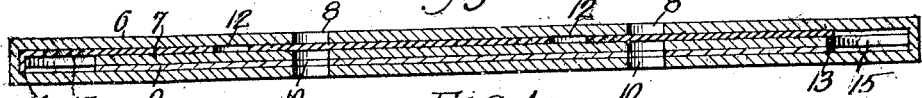
Figure 4 is a view similar to Figure 3, but discloses adjustment of the primary blade to an intermediate position, and ready as its movement continues, to blank the housing openings and effect operation of the secondary blade.
Figure 5:
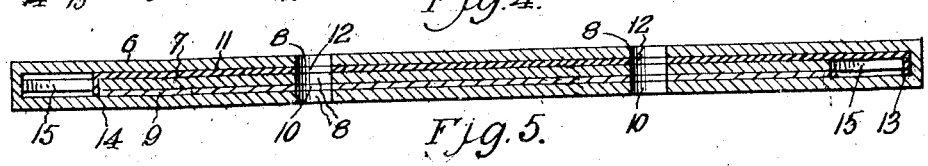
Figure 5 is another section similar to Figures 3 and 4, but showing the shutter in "exposure" position, that is with the openings of the secondary blade in register with the housing openings and the lenses, and the primary blade in an intermediate position in the course of its reverse or return movement, with its openings in register with those of the lenses, housing and secondary blade.

To effect "exposure" by bringing the openings 10 and 12 in registration with openings 8 of the housing, the shutter movement is reversed automatically under the power of a spring hereinafter identified, when the manually-applied force is removed or relaxed to a sufficient degree. It will be noted by reference to Figures 3 through 5, with the blades proportional as shown, that as the primary blade abuts the lug 13, the opposite end of said blade has been withdrawn from the lug 14, a distance equal to the length of the initial half of the primary blade movement.

When the primary blade in its reverse movement, disposes its openings 10 in register with the respective openings 8 of the housing and 12 of the secondary blade, the "exposure" is made, and at the same time, the primary blade abuts the lug 14, after which the two blades move together until they attain their normal or "rest" position.

To effect the right-hand movement of the shutter, a lever 16 is disposed within compartment 2 between the front wall thereof and the housing 6, and is pivoted at 17 to said compartment wall. The lever extends up through a slot 18 in the arch 19 at the top of the compartment, and its upper end is conveniently-accessible for manual operation. The lower end of the lever has a slot 20, and at the right-hand side of the slot and opening thereinto, the lever has an offset notch providing a downwardly-facing shoulder 21. When the shutter and lever are in normal position, the notch of the latter is in engagement with the pin 22, projecting forwardly from the primary blade through a longitudinal slot 23 in the front wall of the housing, and the shoulder 21 overlies said pin. The length of the slot 23 equals the full length of the movement of the primary blade in either direction, and may determine the length of said movement, but if of greater length, the primary blade movement may be determined by abutments against the ends of the housing. In this connection, it will be noted by reference to Figure 2, that the pivotal point of the lever 16, is offset with respect to the midlength point of the slot 23, this arrangement being necessary to permit of the dislocation of the pin 22 from the lever notch into the unnotched part of the lever slot 20, as the lever swings to impart right-hand movement to the shutter, so that the shoulder 21 of the lever cannot affect or interfere with the reverse movement of the shutter.

With the pivotal point of the lever 16 in offset relation to the midlength point of the housing slot 23, and the notch in the lever in engagement with the pin 22 of the shutter, any tendency of the latter to slide to the right is prevented, as with the initiation of such movement, the pin 22 presses against the lever and the shoulder 21 of the latter applies downward pressure on said pin to clamp it downward upon the lower wall of slot 23. It will thus be seen that the shutter is locked in normal position should the camera be tilted downward at its right-hand end, or should it be subjected to shock or jar. Opposite tilting or jarring of the camera when the shutter is in normal position has no tendency to disturb it, provided of course it is not jarred severely.

If the camera is tilted to raise the right-hand end when the shutter is at the right-hand of its travel, and the lever 16 is slowly moved by hand, the primary blade by the action of the spring hereinbefore mentioned, on the primary blade, will result in left-hand movement of the latter, but there will be no "exposure" because the secondary blade, then unrestrained, will gravitate to the left at the same time, and thus dispose its openings 12, to the left of the housing openings 8, before the openings 10 of the primary blade register with the openings of the housing. This is important when in readiness to make an "exposure," if the scene changes and it is not desired to take the picture. By following the above procedure, the shutter can be brought to normal or "rest" position without making an exposure.

The reverse movement of the shutter is accomplished by a retractile spring 24, interposed between and connecting lever 16 to a tension lever 25, pivoted to and within the compartment 2, and projecting up through a slot 26, in the right-hand arch 27, of said compartment, one wall of the slot being notched as at 28, to secure lever 25 in the particular notch to give the required tension to spring 24 and hence the desired speed of return movement and exposure by the shutter.

For time exposures, the primary blade is moved as explained, to the right by the lever 16, and then the hold on the lever is relaxed to permit the spring 24 to effect slow reverse movement until the openings 10 of the shutter register with the respective openings of the housing and the corresponding openings 12 of the secondary blade. It is then held in that position by the lever 16, for the length of time of the desired exposure.

For snap shots, the force applied to the lever 16, to move the shutter to the right-hand position, is removed to permit the spring 24 to cause the lever 16 to return the shutter to normal position suddenly. By varying the tension of spring 24, the so-called "snap-shots" can be varied in time from $\frac{1}{10}$ of a second to a hundredth of a second or more.

Figure 2:
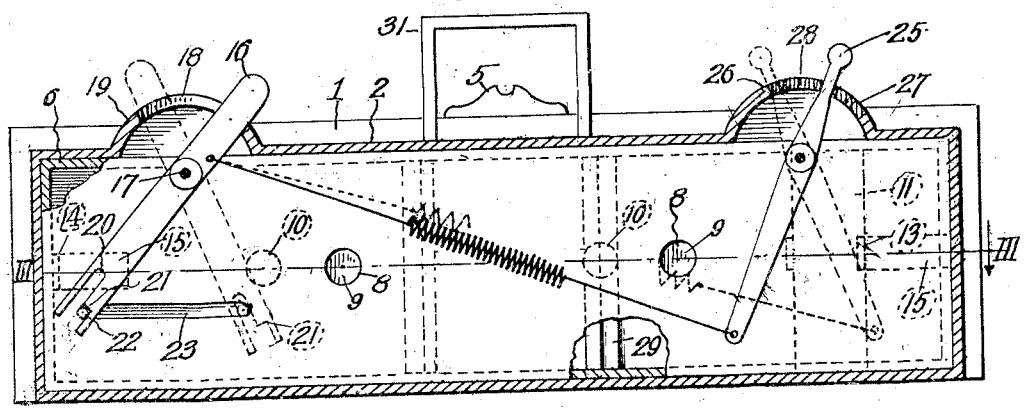
Figure 2 is a vertical section taken on the line II—II of Figure 1, to disclose the front side of a housing containing the shutter, and the mechanism for effecting and controlling operation of the shutter.

To enable an operator to quickly and accurately focus the camera, I have provided it with a scene finder as well as a sight guide, the finder being suitably mounted for vertical adjustment on a fixed part of the camera. As shown, a pair of spaced vertical guides 29, secured to the back wall of the housing, provided with recesses or channels 30 in the inner edges (see Figure 1), wherein slidingly fits the finder 31, through which, when elevated to operative position as shown by Figure 2, one can look for the purpose of centering the sight guide 5, with respect to the finder. The latter may consist, as shown, of a top bar connecting and bracing a pair of depending legs fitting in the recesses or channels of the guides 29. Any suitable means, not shown, may be utilized to prevent the finder from being drawn completely from position through too rapid or careless handling. The particular form of the finder and the parts cooperating therewith are suitable for use with the type of camera illustrated, but such features, of course, are not indispensable.

From the foregoing and the drawing, it will be apparent that I have produced a camera embodying the features of advantage set forth as objectives, and while I have described and illustrated a desirable construction, it is to be understood that modifications in various particulars are feasible without departing from the spirit and scope of the appended claims.

I claim:

1. In a camera, a housing, a reciprocatory shutter blade in the housing, means for defining the length of the reciprocatory movements of the blade, manually-operable reciprocatory means for movements intersecting the respective movements of the blade, having a slot receiving part of the blade; the opposite side walls of the slot when the manually-operable means is reciprocated, alternately applying pressure on the blade to reciprocate the same; one of said walls having a shoulder engaged by said part of the blade when the latter is in initial or normal position, and adapted by attempted independent movement of the blade from its normal position, to angularly-apply pressure on the shutter blade to clamp the latter in rigid relation to the housing.

2. In a camera, a housing, a reciprocatory shutter blade in the housing, means for defining the length of the reciprocatory movements of the blade, manually-operable reciprocatory means for movements intersecting the respective movements of the blade, having a slot receiving part of the blade; the opposite side walls of the slot when the manually-operable means is reciprocated, alternately applying pressure on the blade to reciprocate the same; one of said walls having a shoulder engaged by the said part of the blade when the latter is in initial or normal position, and adapted by attempted independent movement of the blade from its normal position, to angularly-apply pressure on the shutter blade to clamp said part thereof against a wall of the slot receiving it to lock the latter against movement away from its normal position.

3. In a camera, a housing, a lever having a fixed pivotal point in the housing and provided with a slot forming two walls, one wall having a notch in its inner edge providing a shoulder, the housing having a slot disposed in a path intersecting that described by the slot of the lever at any point in the operation of the latter, and a shutter blade within the housing for reciprocatory action in the direction of the housing slot, and provided with a pin projecting through said slot and, when the blade and lever are in initial or normal position, engaging the notch of the latter, the pivot of the lever being off-center with respect to the midlength point of said housing slot, to cause said shoulder to press said pin against a wall of the housing slot, under pressure applied on the lever by movement initiated by the shutter.

4. In a camera, a housing, a reciprocatory shutter blade therein having a pin, a lever fulcrumed on the housing and manually operable from initial or normal position to move the shutter blade in one direction and automatically operable in the reverse direction to reverse the blade movement when the operator releases it, the lever having a slot engaging said pin for effecting the movement of the blade, and a shoulder for movement in a path intersecting that of said pin, and adapted under pressure initiated by the blade and applied by said pin on said housing, to clamp the pin and blade in fixed relation to the housing.

5. In a camera, a housing, a reciprocatory shutter blade therein having a pin, a lever fulcrumed on the housing and manually operable from initial or normal position to move the shutter blade in one direction and automatically operable in the reverse direction to reverse the blade movement when the operator releases it, the lever having a slot engaging said pin for effecting movement of the blade, a shoulder for movement in a path intersecting that of said pin, and adapted under pressure initiated by the blade and applied by said pin on the housing, to clamp the pin and blade in fixed relation to the housing, and yielding means for returning the lever and blade to their initial or normal positions upon release of the lever by the operator.

6. In a camera, a housing, a partition therein having a longitudinal slot, a reciprocatory shutter blade in the housing having a pin projecting through said slot, a lever fulcrumed on the housing and provided with walls at opposite sides of said pin to effect reciprocatory movement of the blade, and with a downwardly-facing shoulder for overlying said pin when the lever and blade occupy their initial or normal positions; said pin under movement initiated by the blade imposing pressure on the lever to cause its shoulder to clamp the pin against a wall of said slot.

7. In a camera, a housing, a partition therein having a longitudinal slot, a reciprocatory shutter blade in the housing having a pin projecting through said slot, a lever fulcrumed on the housing and provided with walls at opposite sides of said pin to effect reciprocatory movement of the blade, and with a downwardly-facing shoulder for overlying said pin when the lever and blade occupy their initial or normal positions; said pin under movement initiated by the blade imposing pressure on the lever to cause its shoulder to clamp the pin against a wall of said slot, and yielding means tensioned by operation of said lever from its initial or normal position for returning said lever to initial or normal position.

8. In a camera, a housing, a partition therein having a longitudinal slot, a reciprocatory shutter blade in the housing having a pin projecting through said slot, a lever fulcrumed on the casing and manually-operable from initial or normal position to swing one end in an arc intersecting the said slot to apply pressure on said pin to impart movement in one direction to said blade; said lever having a shoulder at its said slot-bridging end overlying said pin when the lever and blade occupy their initial or normal positions, and adapted for clamping said pin against said partition under movement initiated by the blade to cause said pin to impose pressure on the lever tending to swing it from initial or normal position.

9. In a camera, a housing, a partition therein having a longitudinal slot, a reciprocatory shutter blade in the housing having a pin projecting through said slot, a lever fulcrumed on the casing and manually-operable from initial or normal position to swing one end in an arc intersecting the said slot to apply pressure on said pin to impart movement in one direction to said blade; said lever having a shoulder at its said slot-bridging end overlying said pin when the lever and blade occupy their initial or normal positions, and adapted for clamping said pin against said partition under movement initiated by the blade to cause said pin to impose pressure on the lever tending to swing it from initial or normal position, a second manually-operable lever fulcrumed on the casing, means to secure it in different angular positions relative to the first-named lever, and a retractile spring connecting said levers, to be tensioned or relaxed by swinging adjustment in one direction or the other of the said second lever, and by movement of the first-named lever from initial or normal position, and adapted after operation and release of the first-named lever, to return the same to initial or normal position.

10. In a camera, a housing having an internal longitudinal slot, a reciprocatory shutter blade within the housing and movable lengthwise of said slot and provided with a pin projecting through said slot, a manually-operable lever fulcrumed on the housing in offset relation to the mid-length point of the slot and provided with a slot receiving said pin; the lever, within its slot, having a shoulder overlying said pin when in initial or normal position to clamp said pin against a wall of said housing slot under movement initiated by the shutter blade tending to swing the lever from initial or normal position, the opposite walls of the lever slot in movements initiated by the lever applying pressure alternately on said pin to respectively move the blade from and back to initial or normal position.

11. In a camera, a housing having an internal longitudinal slot, a reciprocatory shutter blade within the housing and provided with a pin projecting through said housing slot, a lever fulcrumed on the housing to be manually swung in one direction, and offset at its fulcrum point with respect to the mid-length center of the slot; one end of said lever bridging the slot and provided with a slot at such end receiving said pin, the lever slot containing a shoulder to describe an arc starting from a plane above said pin when the lever and blade occupy their initial or normal positions and ending in a plane below that of said pin when the latter has been moved to the opposite end of said slot by one wall of the lever slot, and automatic means for returning the lever to initial position to cause the opposite wall of the slot to apply pressure on said pin to return the blade to initial position with the said pin under the said shoulder.

ARTHUR RINGER.